Patented Aug. 5, 1947

2,425,087

UNITED STATES PATENT OFFICE 2,425,087

CONVERSION OF HYDROCARBONS IN THE PRESENCE OF A CATALYST CONSISTING ESSENTIALLY OF TITANIA GEL AND BORON OXIDE

Joseph D. Danforth, Downers Grove, Ill., assignor to Universal Oil Products Company, Chicago, Ill., a corporation of Delaware No Drawing. Original application May 16, 1941, Serial No. 393,773. Divided and this application December 11, 1944, Serial No. 567,775

9 Claims. (Cl. 196—52)

This application is a division of application Serial No. 393,773, filed May 16, 1941, which is in turn a continuation-in-part of application Serial No. 304,697, filed November 16, 1939. The invention relates to a process for reforming olefinic gasolines such as those formed by a thermal cracking process. More particularly, this invention is related to the use of certain catalysts which have been shown to be particularly effective in increasing the octane number of the aforesaid charging stocks with the minimum of side reactions leading to the formation of normally gaseous products.

The catalysts of my invention comprise synthetically prepared composite masses comprising boric oxide and the calcined hydrous oxides of certain elements. The reforming of olefinic gasolines is associated with the deposition of carbonaceous material and it is a requisite of the catalysts used that they be stable not only at the temperature required for the conversion process but also at the temperature and other conditions to which a contact mass is subjected during the regeneration step. The common method used in regenerating the catalysts which have been used for conversions in which carbonaceous material is deposited on the catalysts is to remove said carbonaceous material by oxidizing it with gases containing a controlled quantity of oxygen. The temperature used during this regeneration process is at least equal to that used in the conversion step and in some cases somewhat higher in order to permit regeneration in a minimum of time.

The catalysts used in my process are prepared by compositing boric oxide with the hydrous oxides of such elements as aluminum, zirconium, thorium, titanium and others. The character and efficiency of the composite boric oxide catalysts will depend somewhat upon the material and the amount thereof which is deposited with the boric oxide. In the case of alumina and boric oxide, satisfactory results have been obtained with a composition containing 20 to 70 mol percent of boric oxide. Highly active catalysts have been prepared by compositing 5 to 30 percent boric oxide with titania and 20 to 45 percent boric oxide with zirconia. The degree of activity depends not only on the percentage composition but also upon the method of preparation. In general, however, minor proportions of boric oxide are used with major proportions of the remaining component.

Numerous methods of compositing boric oxide with the remaining components are possible and the scope of the present invention is not considered as limited to the methods herein described. Gels of the hydrates of titanium oxide, zirconia or alumina, may be mixed in the powdered condition with boric oxide and the composite heated until apparently dry. Upon cooling, the powdered mixture may be formed into particles by conventional process such as pressing, pelleting, and extruding. In an alternative procedure, salts such as aluminum chloride hexahydrate, which decomposes upon heating to form the corresponding oxide, are intimately mixed with the boric oxide and the mixture heated until the salt is decomposed to form the oxide. The chlorides need not necessarily be used, other salts such as, for example, the nitrate, sulfate, oxalate, and acetate may be utilized. As an example of further alternative methods, boric anhydride as well as boric acid or a perborate may be dissolved in water and a soluble salt of titanium, zirconium, thorium, or aluminum added in the desired proportion. Alkaline precipitants such as ammonium hydroxide may be added to precipitate the component whereupon the precipitate is filtered, washed, and dried and formed into particles as mentioned above.

The hydrous oxides of such elements as alumina, zirconia, titania, and thoria may also be admixed with one another in various combinations according to the present invention and major proportions of this admixture composited with minor proportions of the boric oxide. In this case a number of procedures may be used in compositing the materials. The major components may be mixed as partly dried gels and the boric oxide added thereto or the major components may be mixed while wet and dried at approximately 225–250° F. and the boric oxide subsequently admixed. Alternatively the major components may be precipitated one upon the other or co-precipitated and the boric oxide added before or after drying the precipitated hydrated oxides.

More or less inert materials may be mixed in with the catalytic material to serve as spacing agents and for purposes of lending support to the catalytic material. These may be present in the proportions up to 50 per cent more or less of the final catalytic material. These relatively inert materials include such substances as clay, fuller's earth, bentonite, montmorillonite, infusorial earth, diatomaceous earth, or kieselguhr, zeolite, and glauconite as well as dried silica gel, pumice, etc. Particularly effective composites may be made by blending synthetically prepared composites consisting of hydrated silica, hydrated alumina and/or hydrated zirconia to which boric oxide has been added.

Hydrous oxides of such elements as chromium, vanadium, nickel, and iron are not satisfactory as constituents of composite catalysts of my invention. The oxides of these elements and in general the compounds of those elements which undergo valence change during the conversion process and in the regeneration treatment following said conversion, do not act as satisfactory catalysts. These elements that vary in valence cause a formation of excessive quantities of carbonaceous material and gaseous products.

The catalysts of the present invention may be conveniently utilized in carrying out the desired reaction when employed as filling material in tubes or chambers in the form of small pellets or granules. The average particle size may vary within the approximate range of 2 to 10 mesh, the pellets being either of uniform size such as short cylindrical shapes or irregular shapes produced by consolidating and sizing the powdered catalytic material. The charging stock comprising a thermally cracked gasoline or other highly olefinic gasolines, is heated to a temperature within the approximate limits of 800–1100° F. and the vapors passed over a satisfactory mass of the catalyst particles. The preferred procedure is one which is sufficiently superatmospheric so as to force the charging stock through the catalyst and into a separating system without the use of vacuum apparatus. As the pressure is increased, the amount of polymerization as well as carbon formation is considerably increased. At the higher temperatures pressures as much as 100 pounds per square inch may be used although pressures of 5 to 10 pounds per square inch gauge are preferable. The space velocity used depends upon the temperature and as this drops below 900° F. the space velocity decreases to a point where the quantity of catalyst required becomes quite large and the process becomes less attractive when considered from the commercial viewpoint. When operating at a temperature of 950° F. space velocities varying within the limits of 3 to about 80 volumes of liquid charging stock per hour per unit volume of catalyst, may be used. As increasingly higher temperatures are used the amount of gas formation increases and at temperatures above 1100° F. the liquid volume losses associated with a definite increase of octane number becomes undesirably high and is not compensated by the decreased size of the reactors necessary at such a temperature. Owing to the relatively small amount of heat being absorbed or liberated in the reaction, adiabatic reactors are preferred because of their simplicity and reduced cost of construction. The reformed products are then quenched and subjected to a stabilizing operation in order to prepare a motor fuel of the desired volatility.

The reactions taking place in the reforming of olefinic gasolines by the catalysts comprised within the scope of my invention are not thoroughly understood. In the thermal cracking of higher boiling hydrocarbons to form gasoline, some of the double bonds present in the olefinic molecules are probably not in the most stable position and at the high temperature used in the reforming process, a shift in the position in these double bonds undoubtedly takes place. It is assumed that the double bonds are more centrally located as a result of the contact action and this may be, in part, responsible for the higher octane number. In addition to the shift in double bond, a certain amount of branching undoubtedly takes place resulting in the formation of iso-olefins from those of normal structure. The amount of cracking taking place in the reforming process promoted by the catalyst of this present invention is comparatively small. The amount of liquid volume loss associated with the reforming of a complete boiling range of gasoline is usually less than 5 per cent. The amount of polymerization when operating at pressures only mildly superatmospheric is so small that in some cases it would not be necessary to redistil the product to remove the heavy bottoms. In some cases, particularly when the pressure is increased to the upper limits of 50 to 100 pounds per square inch, the amount of polymer formed is sufficiently great that it may be advisable or necessary to redistil the product. It has also been observed in some cases that a catalyst not completely regenerated is more desirable than one that has been completely freed from carbonaceous deposits. In some cases it may also be desired to prefractionate the charging stock and process only the higher boiling portion. In this case the complete boiling range gasoline may be fractionated into two fractions, the lower boiling portion and the higher boiling portion, the latter for example, having an initial boiling point of about 200° F. When operating with such a gasoline fraction it may in some cases be found desirable to increase the severity of operating conditions so as to promote a mild cracking and the formation of light ends. All such variations in the operating conditions are comprised within the scope of my invention.

The following examples are given to illustrate the process of my invention:

Example I

A catalyst was prepared containing 57 mol percent boron oxide and 43% alumina by mixing 242 parts by weight of aluminum chloride hexahydrate and 46½ parts by weight of boric anhydride. The mixture was heated at approximately 900° F. for several hours until the evolution of hydrogen chloride and water had substantially ceased. After cooling, the powder was consolidated to form granules of approximately 6 to 10 mesh. A thermally cracked gasoline having an octane number of 61.2 A. S. T. M. motor method and having been obtained by processing a Texas gas oil, may be used as the charging stock. When using a pressure of one atmosphere, a temperature of 950° F. and a liquid hourly space velocity of 10, a 99.5 volume percent liquid recovery of gasoline having an octane number of 68.1 A. S. T. M. motor method may be obtained.

Example II

In this example a catalyst was prepared containing approximately 40 mol percent of boric anhydride and 60 mol percent of zirconia. 462 parts of hydrated zirconia and 35 parts of boric anhydride were mixed and dried at approximately 220–240° F. The dried particles were pulverized and then consolidated to form approximately 6 to 10 mesh granules. The granules were then heated at approximately 900° F. for one hour. When utilizing the charging stock of the preceding example and operating at a temperature of 950° F., a pressure of one atmosphere and a liquid hourly space velocity of 10, a 99.2 volume percent liquid recovery may be obtained with the product having an octane number of 69.0.

Example III

A catalyst was prepared having the molar composition of $100SiO_2:10Al_2O_3:11B_2O_3$. A commercial grade of sodium silicate containing approximately 28.5% silicon dioxide and 9% by weight of sodium oxide was diluted with approximately 10 volumes of water. Hydrochloric acid was gradually added while agitating until the mixture was barely alkaline to phenolphthalein. The silica gel which formed was well broken up and a small additional amount of hydrochloric acid was added until the mixture was just acid to Congo red whereby substantially complete precipitation of the silica gel was effected. The silica gel suspension was then brought back to practically a neutral point when tested with litmus and charged to a filter. The material on the filter was washed with dilute aluminum chloride solution until the filtrate no longer gave a test for sodium with magnesium uranyl acetate reagent. The cake on the filter was then removed, broken up and slurried in a solution of aluminum chloride. The aluminum chloride present in the solution was in an amount sufficient to give a final alumina composition above noted. Ammonium hydroxide was then added to the slurry until the mixture was just barely acid to litmus whereupon the hydrated alumina was substantially completely precipitated upon the suspended silica gel. The suspension was then directed to a filter and the filter cake therefrom was removed and dried to a water content of approximately 20%. The dried mixture was then ground to pass a 30 mesh screen whereupon it was thoroughly admixed with 9.1% by weight of the total mass of boric oxide powder. The mixture was formed into 6 to 10 mesh granules and calcined at a temperature of approximately 950° F. for one hour. The charging stock used in this example was a cracked gasoline obtained by the thermal cracking of a Pennsylvania gas oil. It had an octane number of 66.0 and a bromine number of 84. When operating at a conversion temperature of 950° F., pressure of one atmosphere and a liquid hourly space velocity of 15, a 96.0 volume percent gasoline having an octane number of 74.9 A. S. T. M. motor method may be obtained.

I claim as my invention:

1. The method of cracking hydrocarbon oils which comprises heating the said oil to cracking temperatures and thereafter contacting it with a catalyst consisting essentially of titania gel containing boria.

2. The method set forth in claim 1 in which the catalyst contains from 5–20% by weight of boria with respect to the titania gel.

3. A process for the conversion of hydrocarbon oils which comprises contacting the hydrocarbons under conversion conditions with a catalyst consisting essentially of titania gel and boric oxide.

4. A process for the conversion of hydrocarbon oils which comprises contacting the hydrocarbons at a temperature in the approximate range of 800–1100° F. with a catalyst consisting essentially of titania gel and boric oxide.

5. A process for the conversion of hydrocarbon oils which comprises contacting the hydrocarbons under conversion conditions with a catalyst consisting essentially of titania gel containing about 5 to 30 percent by weight of boric oxide.

6. A hydrocarbon conversion process which comprises contacting an olefinic gasoline fraction at a temperature in the approximate range of 800–1100° F. with a catalyst consisting essentially of a major proportion of titania gel and a minor proportion of boric oxide.

7. A hydrocarbon conversion process which comprises contacting normally liquid hydrocarbons at a temperature in the approximate range of 800–1100° F. with a catalyst whose catalytic components consist of a major proportion of titania gel and a minor proportion of boric oxide.

8. A hydrocarbon conversion catalyst consisting essentially of a major proportion of titania gel and a minor proportion of boric oxide.

9. A hydrocarbon conversion catalyst consisting essentially of titania gel containing about 5 to 30 percent by weight of boric oxide.

JOSEPH D. DANFORTH.

REFERENCES CITED

The following references are of record in the file of this patent:

UNITED STATES PATENTS

| Number | Name | Date |
| --- | --- | --- |
| 1,986,557 | Connolly et al. | Jan. 1, 1935 |
| 2,301,342 | Sumerford et al. | Nov. 10, 1942 |
| 1,996,009 | Krauch et al. | Mar. 26, 1935 |
| 2,356,576 | Free et al. | Aug. 22, 1946 |